Figure 1:
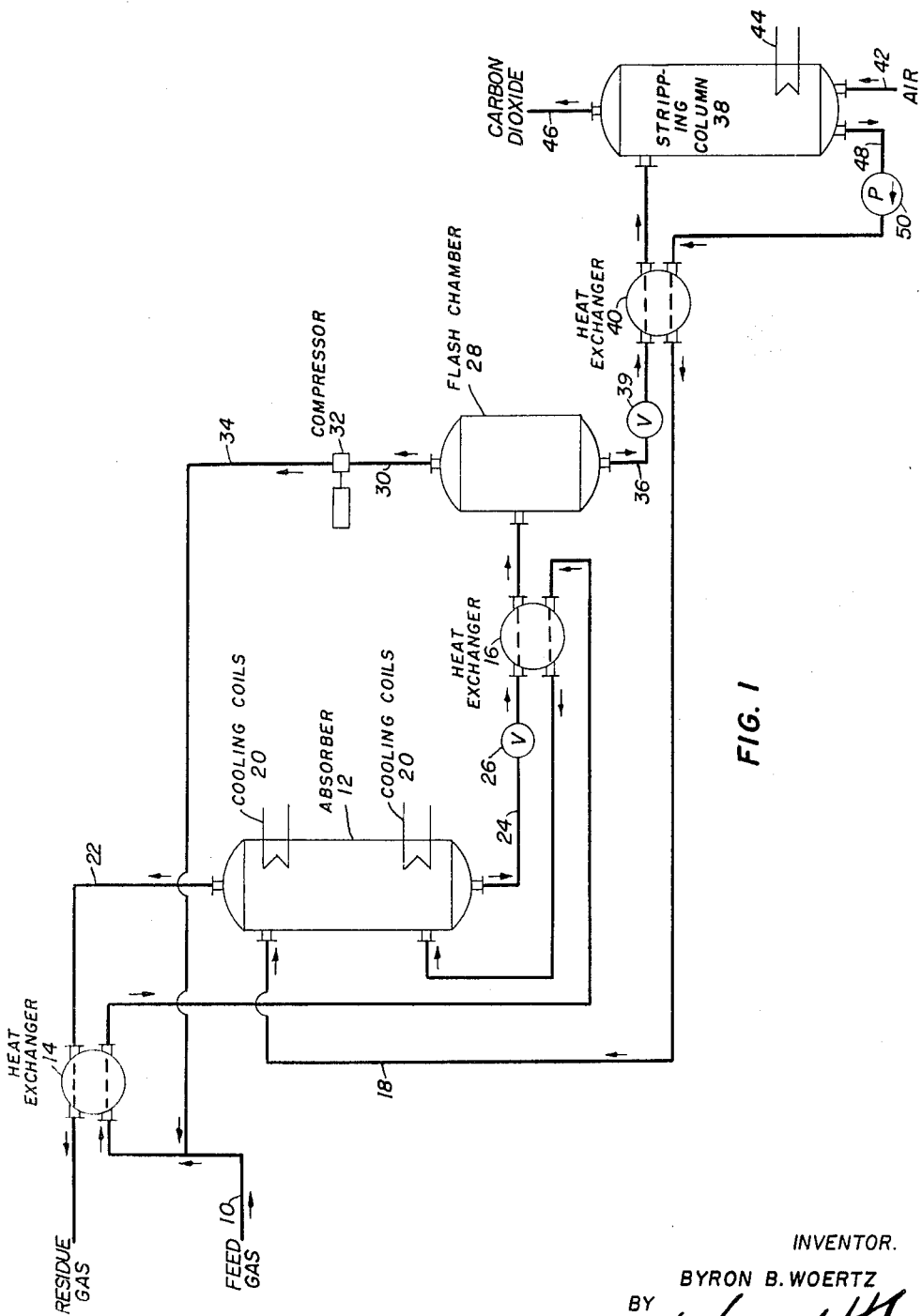

INVENTOR.
BYRON B. WOERTZ
BY
ATTORNEY.

INVENTOR.
BYRON B. WOERTZ
BY
ATTORNEY.

3,252,269
REMOVAL OF ACID CONSTITUENTS FROM GAS
MIXTURES USING ACETOXY ACETONE
Byron B. Woertz, Crystal Lake, Ill., assignor, by mesne
assignments, to Union Oil Company of California, Los
Angeles, Calif., a corporation of California
Filed Dec. 27, 1962, Ser. No. 247,634
13 Claims. (Cl. 55—48)

This invention relates to a selective solvent for removing acid gases from admixtures with nonacidic constituents, and more particularly, to an improved process for the removal of carbon dioxide from a gaseous mixture of hydrocarbons and/or other nonacidic constituents containing carbon dioxide by the use of a selective solvent consisting essentially of acetoxyacetone.

The acid gas content of natural gases varies between broad limits, depending on the field from which it was produced. Natural gases produced from some subterranean reservoirs contain undesirably high concentrations of acid gases, such as carbon dioxide and hydrogen sulfide. Before these gases can be sold, it is necessary that the high concentration of acid gases be removed or at least reduced to an acceptable concentration. Various methods of removing acid gases from natural gas have been proposed. The removal of hydrogen sulfide has been accomplished by several acceptable commercial methods, but the removal of carbon dioxide remains a problem in the art.

Since carbon dioxide is chemically reactive while the hydrocarbon gases are relatively inert, one approach taken in attempting to solve the problem of removing carbon dioxide from mixtures containing the same is the use of solvents which react with carbon dioxide to remove it in chemically combined form. For example, (1) hot potassium carbonate and (2) mono- or diethanolamine have been proposed for removing carbon dioxide from natural gas. However, in order for any separation process to be practical, it must be possible to regenerate and recycle the solvent. It is apparent that regeneration of the chemically reactive solvents is expensive, and processes based on them are especially expensive when high concentrations of $CO_2$ are involved.

It has also been proposed to remove carbon dioxide from gaseous mixtures by the utilization of solvents which have a selective solubility for carbon dioxide. Selective solvents currently used commercially in carbon dioxide removal processes are water, methyl alcohol, acetone and propylene carbonate. The selectivity of water for carbon dioxide is excellent, but its capacity is very low, thereby requiring high circulation rates and large tower sizes in the water-wash process. At ambient temperature, the capacities of methyl alcohol and acetone are high but their selectivities are very poor. Propylene carbonate is the most economical method of removing large concentrations of carbon dioxide from high pressure methane since its capacity for carbon dioxide is high and its selectivity for extracting carbon dioxide from methane is excellent.

Figure 2:
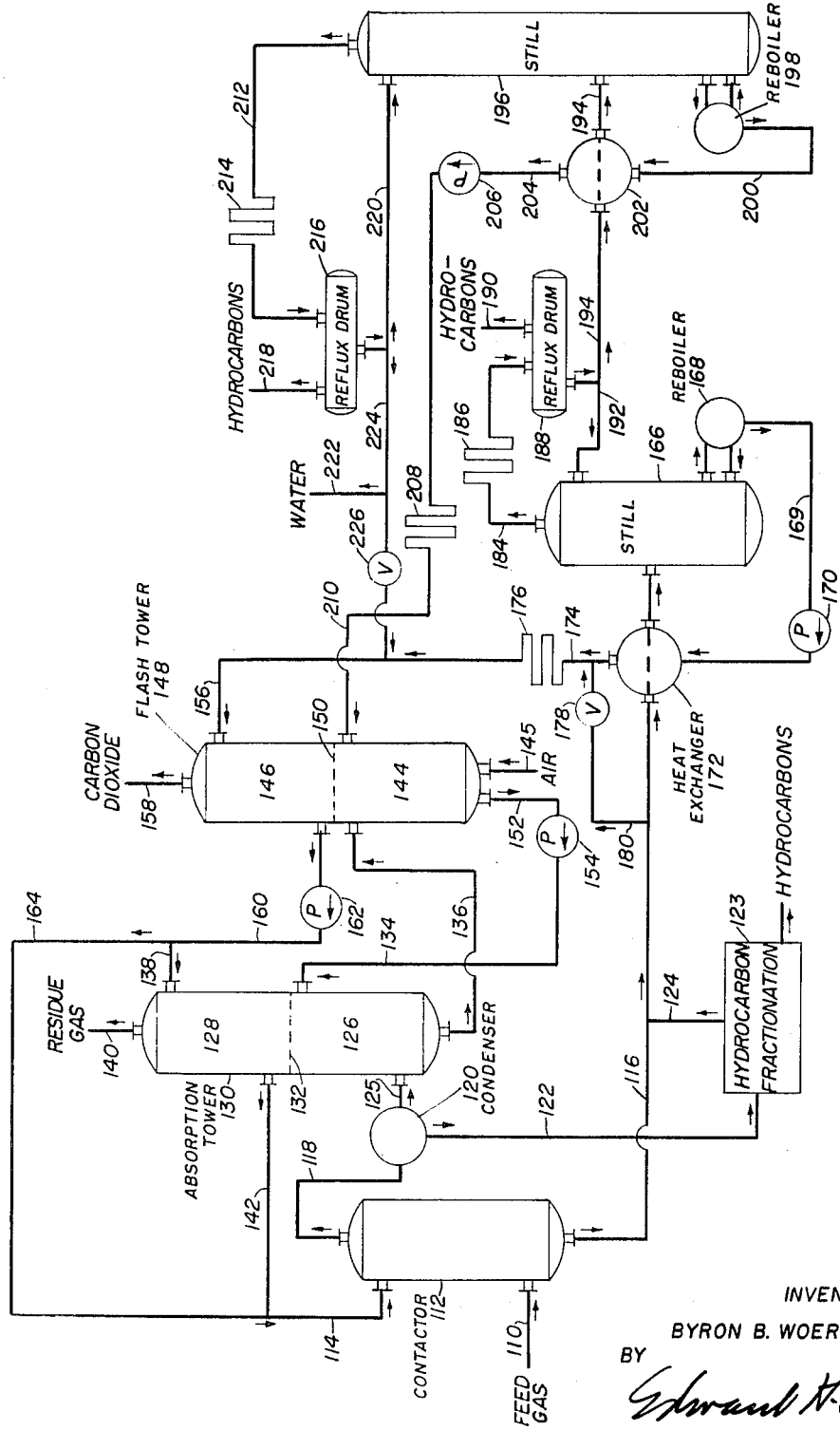

It is, therefore, a primary object of this invention to provide a process for removing acid gases from gaseous mixtures containing same. Another object of this invention is to provide a process for removing carbon dioxide from a hydrocarbon gas mixture containing same. Still another object of this invention is to provide a process for removing carbon dioxide from gaseous mixtures utilizing a superior selective solvent consisting essentially of acetoxyacetone. A still further object of this invention is to provide a process for removing carbon dioxide and moisture from gaseous mixtures containing the same utilizing a solvent consisting essentially of acetoxyacetone in combination with a second, higher boiling, hygroscopic solvent. These and further objects of this invention will become apparent and be described as the description herein proceeds and reference is made to the accompanying drawings in which:

FIGURE 1 is a diagrammatic illustration of an absorption-desorption system for carrying out the process of this invention; and FIGURE 2 is a diagrammatic illustration of an alternative embodiment of an absorption-desorption system for carrying out the process of this invention utilizing a combination of solvents, namely, a solvent consisting essentially of acetoxyacetone and a higher boiling hygroscopic solvent.

This invention is based on the discovery that a solvent consisting essentially of acetoxyacetone, which has the following structure:

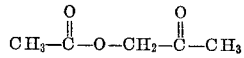

is an effective solvent for removing carbon dioxide from gaseous mixtures containing hydrocarbons and/or other nonacidic constituents. In general, this invention contemplates the removal of carbon dioxide from gaseous mixtures containing same by treatment with a selective solvent consisting essentially of acetoxyacetone. While the process of this invention is especially useful for removing carbon dioxide from natural gas, it is also applicable to the treatment of any carbon dioxide-containing gaseous mixture as long as the solvent has a selectivity for extracting carbon dioxide therefrom. For example, the solvent of this invention can be used for removing carbon dioxide from flue gas, hydrogen, or reformed gas for ammonia synthesis. The selective solvent of this invention is also generally effective for removing hydrogen sulfide from gaseous mixtures.

The acetoxyacetone may be used in the pure form and in admixture with inert solvents to modify one of the properties of the solvent, such as to modify its capacity and/or selectivity for absorbing carbon dioxide. The inert solvent is defined as one which is unreactive toward acetoxyacetone (and other solvent constituents) and the constituents of the gas being treated. In general, the solvent mixture may contain at least about 50% by volume of acetoxyacetone and up to about 50% by volume of at least one inert solvent. Preferred inert solvents are liquids which are also selective absorbents for carbon dioxide. Examples of suitable solvents with which the solvent of this invention may be used in admixture include propylene carbonate, ethylene carbonate, N,N'-dimethylformamide, methyl cyanoacetate and hydracrylonitrile. Ethylene carbonate, having a melting point of about 95° F., is considered a liquid in this specification since mixtures of it with other solvents are usually liquid at ambient temperatures, e.g., 70°–80° F.

The process of this invention is carried out using conventional absorption procedures, wherein the gaseous mixture is contacted with the selective solvent of this invention in either batchwise or counter-current treatment. Successive batchwise extractions also can be used. In the preferred method of practicing the invention, the gaseous mixture to be treated is contacted in a countercurrent absorption tower with the absorbent in a continuous flow method. The spent solvent is continuously wthdrawn from the absorption tower and is introduced into a flash chamber and/or air-stripping column to remove the absorbed gases. Vacuum flash can be substituted for air stripping, if desired. The regenerated solvent is then recycled through the absorption tower where it is used again.

The extraction process is preferably carried out at temperatures within the range of about 0° to 100° F. although higher and lower temperatures may be utilized. It will be evident that the minimum temperature at which any specific solvent can be used is the minimum temperature at which the composition is a liquid. Pressures from about 100 to 1000 p.s.i.g. (pounds per square inch gauge) may be used. The vaporization loss of the solvent is a factor to be considered in determining the contacting conditions. The maximum contact temperature should be limited to prevent an excessive loss of the solvent. In general, the feed gas and solvent are contacted at a rate of 5 to 150 gallons of solvent per M c.f. of gas measured at 14.7 p.s.i.a. and 60° F.

This invention is best understood by reference to FIGURE 1, wherein a feed gaseous mixture such as natural gas, containing carbon dioxide which is to be removed therefrom, is fed through line 10 into the bottom of absorber 12 after it passes in indirect heat exchange with the residue gas from absorber 12 in heat exchanger 14 and rich absorbent in heat exchanger 16. The absorbent consisting essentially of acetoxyacetone which is hereinafter referred to merely as the absorbent, is introduced into the top of absorber 12 through line 18. Absorber 12 can be any suitable absorption column, such as a vertically extended column, containing appropriate packing or trays to assure intimate countercurrent contact of the rising feed mixture with the downflowing absorbent, and cooling coils 20 to provide the desired degree of cooling, as illustrated in the drawing. Absorber 12 is maintained under such conditions of pressure, usually superatmospheric, and temperature that carbon dioxide is absorbed from the feed mixture. As previously indicated, the absorption process is preferably carried out at a temperature within the range of about 0° to 100° F. and a pressure of about 100 to 1000 p.s.i.g. The amount and rate of carbon dioxide absorption increase directly with an increase in the pressure maintained in the lower pressure region of the absorption zone. The feed mixture, from which at least part of the carbon dioxide content has been absorbed, is then removed from absorber 12 through line 22, passed in indirect heat exchange with the feed gas in exchanger 14, and fed to a suitable receiver or otherwise disposed of.

The rich absorbent, containing absorbed carbon dioxide, is withdrawn from absorber 12 through line 24. Then, the rich absorbent undergoes a controlled pressure reduction, such as by being passed successively through expansion valve 26 and heat exchanger 16 into flash chamber 28. Flash chamber 28 is maintained at a pressure below the pressure of absorption column 12, but above atmospheric pressure, e.g., about 50 to 200 p.s.i.g. so that the flash gas is about 5 to 10% of the inlet gas in line 10 at standard temperature and pressure. As the absorbent undergoes pressure reduction, it becomes cooled due to the loss of heat of absorption acquired in absorber 12 and expansion of absorbed carbon dioxide to a lower partial pressure. Part of the absorbed carbon dioxide and non-acidic constituents of the feed gas are withdrawn from flash chamber 28 through line 30. The gases in line 30 are compressed in compressor 32 and passed through line 34 to be mixed with the feed gas before it passes through exchanger 14. The partially desorbed adsorbent is withdrawn from flash chamber 28 through line 36 and fed into stripping column 38 after it has passed successively through expansion valve 39 and exchanger 40, in indirect heat exchange with the lean absorbent withdrawn from column 38.

Air or other inert stripping gas is introduced into stripping column 38 through line 42. Stripping column 38 is provided with heating coil 44 to apply heat if necessary. In stripping column 38, substantially all of the remaining absorbed carbon dioxide is removed from the absorbent and withdrawn through line 46 to be disposed of as desired. Line 46 may be provided with a vacuum pump, if desired. The resulting lean absorbent is then withdrawn from stripping column 38 through line 48, where it is forced by pump 50 through heat exchanger 40 and then returned to absorber 12 through line 18. It will be evident that line 18 may include a second heat exchanger, not shown, to further cool the lean absorbent after it has passed through heat exchanger 40.

Other alternative absorption-desorption processes will be apparent to those skilled in the art. For example if it is not desired to limit the loss of the non-acidic constituents of the feed gas, the rich absorbent may be desorbed in a flash or stripping step and the off-gases disposed of as desired. The partially desorbed absorbent may then be recycled to the absorber or introduced into a stripping column to remove the last vestages of absorbed carbon dioxide before it is recycled to the absorption column. The residue gas from the absorber and/or the flash gas may be passed through a solid bed of an adsorbent, such as silica gel, activated alumina, activated carbon or a synthetic zeolite, to separate vaporized absorbent therefrom.

In an alternative embodiment of this invention, the absorbent of this invention may be used in combination with a second higher boiling hygroscopic solvent which is absorptive of it, to avoid the uneconomically high solvent losses which are common in conventional processes. The hygroscopic solvent serves to remove moisture from the feed gaseous mixture, as well as to recover the absorbent which would otherwise be lost in the product gas stream. The hygroscopic solvent is any of the polyhydric alcohols or glycols which have been proposed or used for moisture extraction, such as ethylene glycol, propylene glycol, diethylene glycol, triethylene glycol and aqueous solutions thereof.

This alternative embodiment is best understood by reference to FIGURE 2 wherein the numeral 110 represents the line through which the gas to be treated, for example, a natural gas consisting of hydrocarbons, carbon dioxide, and moisture, is fed into the bottom of contactor 112, in which it is countercurrently contacted with a mixture of the acetoxyacetone solvent and hygroscopic solvent entering through line 114. Contactor 112, which may contain any suitable type and arrangement of trays or baffles as required for intimacy of contact between the absorbent mixture and feed gas, is preferably maintained at a temperature within the range of about 25° to 100° F. and pressure within the range of about 100 to 1000 p.s.i.g., although higher and lower temperatures and pressures may be used. A suitable example of the absorbent mixture entering contactor 112 through line 114 is 75 to 95% by weight of a glycol, such as diethylene glycol, 0 to 10% by weight of acetoxyacetone, and 0 to 20% by weight of water, the amount of water being indirectly proportional to the contacting temperature to reduce the glycol viscosity. For low temperature operation, as at about 25° to 60° F., for example, a small amount of water is required in the glycol to maintain a satisfactory viscosity; the glycol containing a minor amount of water will still dehydrate the feed gas satisfactorily. In contactor 112, much of the water content of the feed gas stream is taken up by the glycol solvent. Glycol absorbent, containing water and some acetoxyacetone absorbent, is withdrawn from contactor 112 through line 116. The resulting natural gas acetoxyacetone absorbent mixture leaves contactor 112 through line 118, and flows to chiller-condenser 120, in which its temperature is reduced to absorption temperature, for example, 25° to 40° F. The condensate is withdrawn for chiller-condenser 120 through line 122 and may be combined with the liquid in line 116. The condensate in line 122 is preferably first introduced into fractionating unit 123 to separate condensed hydrocarbons before it is combined with the liquid in line 116 by way of line 124.

The chilled, uncondensed components of the natural gas-acetoxyacetone absorbent mixture pass from chiller-condenser 120 through line 125 to the absorbing zone which, as illustrated, may be contained within the lower and upper sections 126 and 128 of a single vertically extended absorption tower 130, the two sections being separated by liquid trap-out tray 132. Absorber 130 can have any suitable arrangement of packing or trays to assure intimate countercurrent contact of the rising feed mixture with the downflowing absorbent. In section 126, the gas is countercurrently contacted with acetoxyacetone absorbent entering through line 134, which removes at least part of the acid gas constituents. Rich acetoxyacetone absorbent, containing absorbed carbon dioxide, is withdrawn from absorption tower 130 through line 136. The scrubbed gas passes on upward in tower 130 past trap-out tray 132 into upper section 128, where it is countercurrently contacted with the diethylene glycol entering through line 138. The diethylene glycol absorbent scrubs any vaporized acetoxyacetone absorbent from the natural gas, and the scrubbed natural gas product, of reduced carbon dioxide content, is withdrawn through line 140 to a suitable receiver or other disposition. The mixture of diethylene glycol and acetoxyacetone absorbent from upper section 128 is trapped on tray 132, and is withdrawn through line 142 and introduced into contactor 112 through line 114.

The acetoxyacetone absorbent in line 136 enters a combined flashing and contacting zone which, as illustrated, may be lower flashing zone 144 and upper contacting zone 146 in a single vertically extended vessel 148, with the upper and lower sections being separated by liquid trap-out tray 150. The rich acetoxyacetone absorbent enters flash and stripping zone 144, which is maintained at a pressure below the absorption column pressure, and usually at about atmospheric pressure, where it undergoes pressure reduction to flash-off absorbed carbon dioxide. Zone 144 is provided with suitable contacting devices such as trays or packing. An inert stripping gas, such as air, may be introduced into zone 144 through line 145. The lean acetoxyacetone absorbent is withdrawn from flash zone 144 through line 152 and is introduced back to absorption tower 130 by pump 154 through line 134. Carbon dioxide containing entrained or vaporized acetoxyacetone absorbent leaves flash zone 144, and passes through trap-out tray 150 into contacting zone 146 where it is countercurrently contacted with glycol solvent entering through line 156. The diethylene glycol scrubs any vaporized acetoxyacetone absorbent from the carbon dioxide, and the carbon dioxide and stripping gas are withdrawn through line 158 to be disposed of as desired.

The resulting mixture of diethylene glycol and acetoxyacetone absorbents from contacting zone 146 of vessel 148 is trapped on tray 150 and withdrawn through line 160. Part of the solvent mixture in line 160 is passed by pump 162 to branch line 138 from where it introduced into upper section 128 of contactor 130. The remainder of the solvent in line 160 is passed through line 164 and combined with the solvent mixture in line 142 to form the mixture entering contactor 112 through line 114.

The diethylene glycol containing water and some acetoxyacetone absorbent, which was withdrawn from contactor 112 through line 116, is fed into glycol still 166, equipped with reboiler 168. Regenerated diethylene glycol, substantially free of acetoxyacetone absorbent and water, is removed from reboiler 168 through line 169 and forced by pump 170 through heat exchanger 172, where it passes in indirect heat exchange with the mixture in line 116. From heat exchanger 172, the regenerated diethylene glycol passes through line 174, cooler 176 and line 156 to contacting zone 146 of vessel 148. If desired, part of the mixture in line 116 may be made to by-pass still 166 by opening valve 178 so that it passes through line 180 into line 174. Water and acetoxyacetone absorbent are withdrawn as overhead from still 166 through line 184, and are passed through overhead condenser 186 and into reflux drum 188. Non-condensable hydrocarbon gases are vented from reflux drum 188 by line 190. From reflux drum 188, part of the liquid is returned through line 192 to still 166, while the balance is passed through line 194 to still 196.

Still 196 is provided with reboiler 198 from which regenerated acetoxyacetone absorbent is withdrawn through line 200 and passed in heat exchange with liquid in line 194 in heat exchanger 202. The acetoxyacetone solvent is then withdrawn from heat exchanger 202 through line 204 and forced by pump 206 through cooler 208 and line 210 into flash zone 144 of vessel 148. The overhead from still 196, consisting mainly of water, is withdrawn through line 212 and passed through condenser 214 into reflux drum 216, from which hydrocarbons are withdrawn through line 218. Part of the water in reflux drum 216 is returned through line 220 to still 196, and the remaining portion is discarded through line 222 or fed through line 224 into line 156 by opening valve 226. A pump, not shown, is required near valve 226.

The following specific examples will serve more particularly to point out the instant invention:

EXAMPLE I

A gaseous mixture containing 25 mol percent carbon dioxide and 75 mol percent methane is brought into equilibrium with acetoxyacetone at 40° F. and 900 p.s.i.a. When analyzed, the resulting solution is found to contain 28.9 mol percent of carbon dioxide, 4.7 mol percent of methane, and the balance acetoxyacetone. This indicates a solubility under these conditions of 12.9 s.c.f./gallon of carbon dioxide and 2.1 s.c.f./gallon of methane.

EXAMPLE II

Tables I to IV are illustrative of the process streams of the process depicted in FIGURE 1 wherein a natural gas mixture is contacted in absorber 12, maintained at 600 p.s.i.a. and 40° F. (Tables I and II) or 70° F. (Tables III and IV) and containing ten theoretical trays, with the lean absorbent. One hundred pound mols of the natural gas per unit time are contacted in different runs with acetoxyacetone and propylene carbonate in such amounts that the residue gas contains about 2 vol. percent of carbon dioxide. The rich absorbent withdrawn from absorber 12 is flashed at 150–200 p.s.i.a. and 40°–70° F. in flash chamber 28 and the pressure of the partially desorbed absorbent withdrawn from flash chamber 28 is reduced to atmospheric pressure in stripping column 38. Tables I and III give the compositions of the process streams where the gas is contacted with acetoxyacetone and, for the purpose of comparison, Tables II and IV give the composition of the process streams wherein the gas is contacted with the propylene carbonate.

The efficiency of acetoxyacetone as a selective solvent for removal of acid gases from a gaseous mixture containing the same can be seen by a review of the data in the tables. Tables I and II shows that at 40° F. acetoxyacetone has a better capacity for carbon dioxide than propylene carbonate (note the respective circulation rates), although the selectivity of acetoxyacetone is slightly lower than the selectivity of propylene carbonate (note the hydrocarbon content of the residue gas). Again comparing the effectiveness of acetoxyacetone (Table III) with propylene carbonate (Table IV) at 70° F., the acetoxyacetone has improved capacity with a little reduction in selectivity.

Table I

[Solvent: Acetoxyacetone at 40° F. Rich Solvent Flashed at 40° F. and 150 P.s.i.a. Solvent Circulation Rate of 39.5 Gal./M c.f.]

| Component | Mols of Inlet Gas (Line 10) | Residue Gas (Line 22) | | Mols of Rich Solvent (Line 24) | Mols of Flash Gas (Line 30) | Mols of Atmos. Strip Gas (Line 46) | Percent Loss |
|---|---|---|---|---|---|---|---|
| | | Mols | Mol percent | | | | |
| Methane | 72.0 | 71.44 | 90.07 | 4.24 | 3.68 | 0.56 | 0.78 |
| Ethane | 6.0 | 5.28 | 6.66 | 1.66 | 0.94 | 0.72 | 12.0 |
| Propane | 2.0 | 1.00 | 1.26 | 1.47 | 0.48 | 1.00 | 50.0 |
| $CO_2$ | 19.0 | 1.59 | 2.00 | 22.41 | 5.00 | 17.40 | 91.6 |
| n-Butane | 1.0 | 0.01 | 0.01 | 1.18 | 0.19 | 0.99 | 99.0 |
| Absorbent | 0 | 0 | 0 | 116.50 | 0 | 0 | |
| Total | 100.00 | 79.32 | 100.0 | 147.46 | 10.29 | 20.67 | |

Table II

[Solvent: Propylene carbonate at 40° F. Rich Solvent Flashed at 40° F. and 150 p.s.i.a. Solvent Circulation Rate of 44.5 Gal./M c.f.]

| Component | Mols of Inlet Gas (Line 10) | Residue Gas (Line 22) | | Mols of Rich Solvent (Line 24) | Mols of Flash Gas (Line 30) | Mols of Atmos. Strip Gas (Line 46) | Percent Loss |
|---|---|---|---|---|---|---|---|
| | | Mols | Mol percent | | | | |
| Methane | 72.0 | 71.57 | 89.41 | 3.68 | 3.25 | 0.43 | 0.60 |
| Ethane | 6.0 | 5.47 | 6.83 | 1.29 | 0.76 | 0.53 | 8.8 |
| Propane | 2.0 | 1.29 | 1.61 | 1.07 | 0.36 | 0.71 | 35.5 |
| $CO_2$ | 19.0 | 1.60 | 2.00 | 22.54 | 5.15 | 17.39 | 91.5 |
| n-Butane | 1.0 | 0.12 | 0.15 | 1.06 | 0.18 | 0.88 | 88.0 |
| Absorbent | 0 | 0 | 0 | 167.20 | 9 | 0 | |
| Total | 100.00 | 80.05 | 100.00 | 196.84 | 9.70 | 19.94 | |

Table III

[Solvent: Acetoxyacetone at 70° F. Rich Solvent Flashed at 70° F. and 200 p.s.i.a. Solvent Circulation Rate of 53.4 Gal./M c.f.]

| Component | Mols of Inlet Gas (Line 10) | Residue Gas (Line 22) | | Mols of Rich Solvent (Line 24) | Mols of Flash Gas (Line 30) | Mols of Atmos. Strip Gas (Line 46) | Percent Loss |
|---|---|---|---|---|---|---|---|
| | | Mols | Mol percent | | | | |
| Methane | 72.0 | 70.97 | 90.38 | 5.15 | 4.12 | 1.03 | 1.4 |
| Ethane | 6.0 | 5.06 | 6.44 | 1.83 | 0.89 | 0.94 | 15.7 |
| Propane | 2.0 | 0.91 | 1.16 | 1.51 | 0.41 | 1.09 | 54.5 |
| $CO_2$ | 19.0 | 1.56 | 1.99 | 21.26 | 3.83 | 17.43 | 91.7 |
| n-Butane | 1.0 | 0.02 | 0.03 | 1.15 | 0.16 | 0.98 | 98.0 |
| Absorbent | 0 | 0 | 0 | 157.57 | 0 | 0 | |
| Total | 100.00 | 78.52 | 100.00 | 188.47 | 9.41 | 21.47 | |

Table IV

[Solvent: Propylene carbonate at 70° F. Rich Solvent Flashed at 70° F. and 200 p.s.i.a. Solvent Circulation Rate of 66.9 Gal./M c.f.]

| Component | Mols of Inlet Gas (Line 10) | Residue Gas (Line 22) | | Mols of Rich Solvent (Line 24) | Mols of Flash Gas (Line 30) | Mols of Atmos. Strip Gas (Line 46) | Percent Loss |
|---|---|---|---|---|---|---|---|
| | | Mols | Mol percent | | | | |
| Methane | 72.0 | 71.33 | 89.69 | 4.92 | 4.24 | 0.67 | 0.93 |
| Ethane | 6.0 | 5.36 | 6.74 | 1.63 | 0.99 | 0.64 | 10.7 |
| Propane | 2.0 | 1.19 | 1.49 | 1.32 | 0.51 | 0.81 | 40.5 |
| $CO_2$ | 19.0 | 1.59 | 2.00 | 24.11 | 6.74 | 17.37 | 91.4 |
| n-Butane | 1.0 | 0.06 | 0.08 | 1.20 | 0.27 | 0.93 | 93.0 |
| Absorbent | 0 | 0 | 0 | 253.24 | 0 | 0 | |
| Total | 100.00 | 79.53 | 100.00 | 286.42 | 12.75 | 20.42 | |

The embodiments of the invention in which an exclusive property or privilege is claimed are defined as follows:

1. The process of removing gaseous acid gas selected from the group consisting of carbon dioxide and hydrogen sulfide from admixture with gaseous $C_1$–$C_3$ alkane hydrocarbons which comprises contacting said gaseous admixture with a solvent consisting essentially of acetoxyacetone under conditions resulting in selective absorption of said acid gas, and separating the unabsorbed components of said gaseous admixture from said solvent.

2. The process according to claim 1 in which said acid gas is carbon dioxide.

3. The process according to claim 2 in which said gaseous admixture is a natural gas and said solvent additionally contains a liquid selected from the group consisting of propylene carbonate, ethylene carbonate, N,N-dimethylformamide, hydracrylonitrile and methyl cyanoacetate.

4. The process according to claim 2 in which said gaseous mixture is passed through an absorption zone at superatmospheric pressure in countercurrent contact with said solvent and a stream of rich solvent is removed from said absorption zone and the pressure thereof is reduced to flash off carbon dioxide and at least part of the residual carbon dioxide from said solvent stream following said pressure reduction is removed by air stripping said solvent stream.

5. The process according to claim 4 in which said contacting is carried out at a temperature from about 25° to 100° F. and a pressure from 100 to 1000 p.s.i.g.

6. The process of removing gaseous acid gas selected from the group consisting of carbon dioxide and hydrogen sulfide from admixture was gaseous $C_1$–$C_3$ alkane hydrocarbons which comprises contacting said gaseous admixture in a first contacting zone with a mixture of a first solvent consisting essentially of acetoxyacetone and a second higher boiling solvent adapted to selectively absorb said first solvent; separately withdrawing a liquid stream consisting essentially of said second solvent and a gaseous stream comprising vaporized first solvent and unabsorbed components of said gaseous mixture fed to said first contacting zone from said first contacting zone; passing said gaseous stream through a cooling zone whereby part of said gaseous stream is condensed; separately withdrawing condensate and uncondensed components of said gaseous stream from said first cooling zone; combining said condensate with said liquid stream from said first contacting zone, and separating absorbed second solvent from the combined solution; contacting the uncondensed components of said gaseous stream in a second contacting zone with said first solvent, under conditions resulting in partial vaporization of said first solvent and absorption of said acid gas in the unvaporized first solvent; separately withdrawing a liquid stream of spent first solvent and a gaseous stream from said second contacting zone; contacting the gaseous stream from said second contacting zone in a third contacting zone with said second solvent, under conditions resulting in absorption of vaporized first solvent; separately withdrawing from said third contacting zone the unabsorbed components of the gaseous stream from said second contacting zone and said second solvent containing absorbed first solvent; recycling said second solvent from said third contacting zone to said first contacting zone; and separating the absorbed acid gas from said spent first solvent.

7. The process according to claim 6 in which the uncondensed components of said gaseous stream are passed through said second contacting zone at superatmospheric pressure in countercurrent contact with said first solvent.

8. The process according to claim 7 in which the pressure of said spent first solvent is reduced in a desorbing zone to flash-off acid gas, and the acid gas separated from said spent first solvent in said desorbing zone is contacted with said second solvent in a fourth contacting zone whereby entrained vaporized first solvent is absorbed.

9. The process according to claim 8 in which said second solvent withdrawn from said first contacting zone is introduced into said fourth contacting zone after at least part of the absorbed first solvent is removed therefrom.

10. The process according to claim 9 in which a stream of said second solvent is removed from said fourth contacting zone and parts thereof are introduced into said first and third contacting zones.

11. The process according to claim 10 in which said second solvent is a glycol.

12. The process according to claim 11 in which said second solvent contains a liquid selected from the group consisting of propylene carbonate, ethylene carbonate, N,N-dimethylformamide, hydracrylonitrile and methyl cyanoacetate.

13. The process of removing a gaseous acid gas selected from the group consisting of carbon dioxide and hydrogen sulfide from admixture with gaseous $C_1$–$C_3$ alkane hydrocarbons which comprises contacting said gaseous admixture with 5 to 150 gallons of a solvent, consisting essentially of acetoxyacetone, per M c.f. of the gaseous admixture measured at 14.7 p.s.i.a and 60° F., at a temperature of about 0° to 100° F. and a pressure of about 100 to 1000 p.s.i.g., and separating the unabsorbed components of said gaseous admixture from said solvent.

References Cited by the Examiner

UNITED STATES PATENTS

| 2,086,731 | 7/1937 | Millar et al. | 55—68 |
| 2,139,375 | 12/1938 | Millar et al. | 55—73 |
| 2,781,863 | 2/1957 | Bloch et al. | 55—73 |
| 2,863,527 | 12/1958 | Herbert et al. | 55—73 X |
| 2,880,591 | 4/1959 | Kwauk | 55—48 X |
| 2,926,751 | 3/1960 | Kohl et al. | 55—68 X |
| 3,097,917 | 7/1963 | Dotts et al. | 55—73 X |

FOREIGN PATENTS

| 596,692 | 4/1960 | Canada. |
| 596,693 | 4/1960 | Canada. |
| 728,444 | 4/1955 | Great Britain. |
| 750,399 | 4/1956 | Great Britain. |

REUBEN FRIEDMAN, *Primary Examiner.*

D. TALBERT, *Assistant Examiner.*